No. 784,803. PATENTED MAR. 14, 1905.
A. M. MOYLAN.
COMBINED PAN AND STOVE LID LIFTER.
APPLICATION FILED NOV. 16, 1904.

Inventor
Alexander M. Moylan

Witnesses

By
Attorneys

No. 784,803.

Patented March 14, 1905.

UNITED STATES PATENT OFFICE.

ALEXANDER M. MOYLAN, OF CENTURY, FLORIDA.

COMBINED PAN AND STOVE-LID LIFTER.

SPECIFICATION forming part of Letters Patent No. 784,803, dated March 14, 1905.

Application filed November 16, 1904. Serial No. 232,997.

*To all whom it may concern:*

Be it known that I, ALEXANDER M. MOYLAN, a citizen of the United States, residing at Century, in the county of Escambia and State of Florida, have invented certain new and useful Improvements in a Combined Pan and Stove-Lid Lifter, of which the following is a specification.

This invention consists of a combined pan and stove-lid lifting device; and the essential feature of the invention resides in the provision of an article of this class possessing an extreme simplicity of construction, whereby it may be manufactured at a comparatively small cost, and one which admits of ready handling of hot pans or the like and replacing or removing lids of stoves.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1:
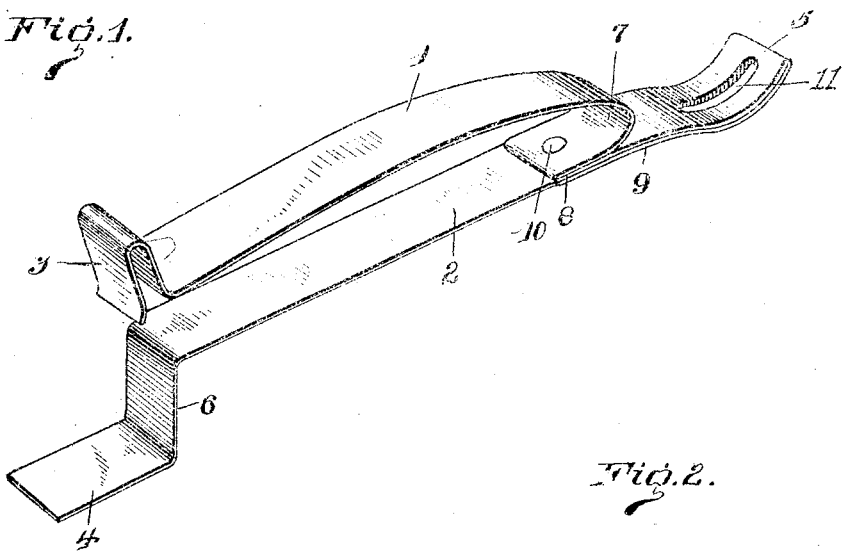
Figure 2:
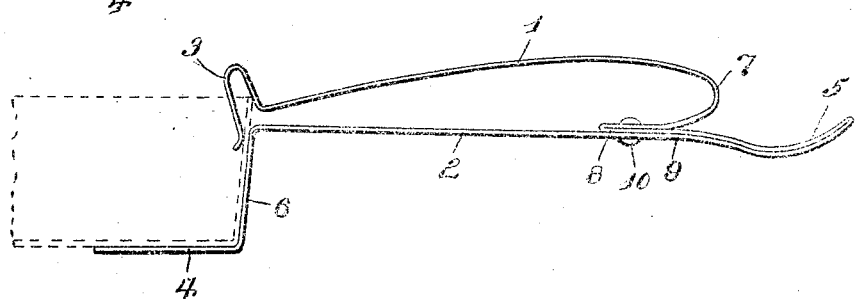
Figure 3:
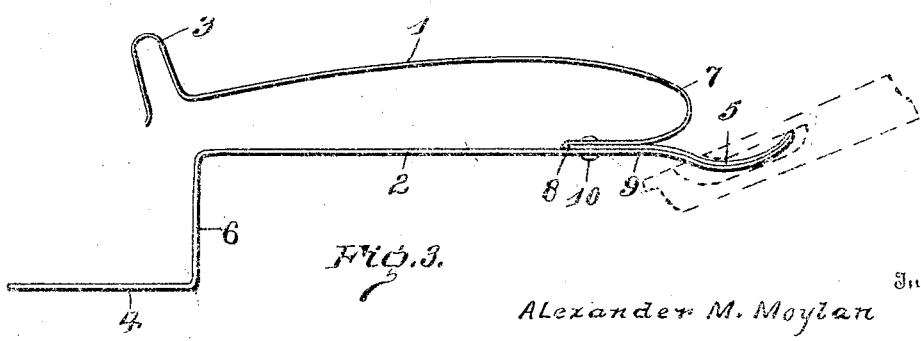

Figure 1 is a perspective view of a device embodying the essential features of the invention. Fig. 2 is a side elevation, a pan being shown in dotted lines. Fig. 3 is a view similar to Fig. 2, the stove-lid-lifting arm being shown engaged with the lid, the latter illustrated in dotted lines.

Corresponding and like parts are referred to in the following description and indicated in all the views of the drawings by the same reference characters.

In carrying out the invention it is designed to make the lifting device as simple as practicable, and for this purpose it is preferred to construct the various members thereof from a single piece of metal, which when formed into the requisite shape will give the desired rigidity necessary, being generally suitable for all purposes of the invention.

The invention comprises a handle which is composed of upper and lower members 1 and 2, respectively, an engaging member 3 at one extremity of the upper member 1, a supporting member 4 at the adjacent extremity of the lower member 2, and a lid-lifting arm 5, extending rearwardly from the handle. The engaging member 3 of the part 1 of the handle is formed by bending the front extremity of said part upwardly and downwardly, this making a U-shaped part readily adapted to receive the upper rim portion of the pan in the actual use of the device. The supporting member 4 is bent forwardly from a downwardly-extending portion 6 at the front end of the member 2, said supporting member 4 being adapted to engage beneath the pan or like article being operated upon in order to hold or carry the weight of the same in conveying the receptacle to a desired point. The member 3 holds the pan firmly in place upon the supporting member 4 in a manner readily apparent.

The stove-lid lifter is peculiarly formed, and for this purpose the upper member 1 of the handle is curved inwardly, as shown at 7, after which it is recurved or extended downwardly and outwardly, as shown at 8. The lower member 2 is likewise projected or curved downwardly, as shown at 9, from the rear extremity of the upper member 1, and since the members 1 and 2 are made from a single strip of metal the parts 8 and 9 form a rigid member readily supporting any such part as a lid or the like.

It will be noted that the handle of the device is common to both the pan-lifting means as well as to the stove-lid lifter, this being obviously advantageous. The upper member 1 of the handle has a spring action, and the normal tendency of this member is to move away from the member 2, it being necessary to hold the members 1 and 2 together in order that the engaging member 3 may clamp a pan or similar receptacle. To further subserve the rigidity of the device, the inwardly-curved portion 7 of the member 1 and the adjacent recurved portion are firmly secured to the rear portion of the member 2 by means of a rivet 10 or similar fastening, which positively holds the various parts of the device in position.

The portions 8 and 9 of the lid-lifting arm of the device may be provided with a longitudinal slot or opening 11, admitting of ready suspension of the device upon a nail or similar part when not in use.

Having thus described the invention, what is claimed as new is—

A pan-lifter comprising a single piece of metal bent upon itself between the ends to form a handle composed of upper and lower members, the upper member being upwardly and downwardly bent at one end to form an engaging member, the lower member being downwardly and outwardly bent to form a supporting member, the opposite end of the upper member being inwardly curved and thence recurved and projected downwardly from the handle, the lower member having its opposite end also downwardly curved adjacent the recurved portion of the upper member and forming therewith a stove-lid-lifting arm, the inwardly-curved and recurved portions of the upper member being permanently fastened to the adjacent portion of the lower member.

In testimony whereof I affix my signature in presence of two witnesses.

ALEXANDER M. MOYLAN. [L. S.]

Witnesses:
JAMES H. JONES,
J. E. STRICKLAND.